United States Patent
Murari et al.

(10) Patent No.: US 7,898,267 B2
(45) Date of Patent: Mar. 1, 2011

(54) CAPACITIVE POSITION SENSING IN AN ELECTROSTATIC MICROMOTOR

(75) Inventors: Bruno Murari, Monza (IT); Ubaldo Mastromatteo, Bareggio (IT); Giulio Ricotti, Broni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 12/573,027

(22) Filed: Oct. 2, 2009

(65) Prior Publication Data

US 2010/0019617 A1 Jan. 28, 2010

Related U.S. Application Data

(63) Continuation of application No. PCT/IT2007/000252, filed on Apr. 3, 2007.

(51) Int. Cl.
*H02N 1/00* (2006.01)
*G01R 27/26* (2006.01)

(52) U.S. Cl. .................. 324/686; 324/658; 324/660; 310/309

(58) Field of Classification Search .............. 310/309; 324/661–662, 686, 690
See application file for complete search history.

(56) References Cited

U.S. PATENT DOCUMENTS

| | | | |
|---|---|---|---|
| 4,893,071 A * | 1/1990 | Miller | 324/660 |
| 5,304,937 A * | 4/1994 | Meyer | 324/686 |
| 5,394,096 A * | 2/1995 | Meyer | 324/686 |
| 6,011,389 A * | 1/2000 | Masreliez et al. | 324/207.17 |
| 6,509,620 B2 * | 1/2003 | Hartwell et al. | 257/415 |
| 6,515,489 B2 * | 2/2003 | Min et al. | 324/662 |
| 6,657,444 B2 * | 12/2003 | Fasen | 324/676 |
| 7,570,066 B2 * | 8/2009 | Lee | 324/662 |
| 2005/0062362 A1 | 3/2005 | Yang et al. | |
| 2009/0190254 A1 * | 7/2009 | Jandric et al. | 360/110 |

FOREIGN PATENT DOCUMENTS

EP 1263123 A 12/2002
WO 97/04449 A 2/1997

* cited by examiner

*Primary Examiner*—Burton Mullins
(74) *Attorney, Agent, or Firm*—Lisa K. Jorgenson; Hayley J. Stevens; Seed IP Law Group PLLC (57) ABSTRACT

An electrostatic micromotor is provided with a fixed substrate, a mobile substrate facing the fixed substrate, and electrostatic-interaction elements enabling a relative movement of the mobile substrate with respect to the fixed substrate in a movement direction; the electrostatic micromotor is also provided with a capacitive position-sensing structure configured to enable sensing of a relative position of the mobile substrate with respect to the fixed substrate in the movement direction. The capacitive position-sensing structure is formed by sensing indentation, extending within the mobile substrate from a first surface thereof, and by first sensing electrode, facing, in given operating condition, the sensing indentation.

33 Claims, 6 Drawing Sheets

CAPACITIVE POSITION SENSING IN AN ELECTROSTATIC MICROMOTOR

BACKGROUND

1. Technical Field

The present disclosure relates to capacitive position sensing in an electrostatic micromotor, in particular for atomic-level storage systems generally known as "probe storage" systems.

2. Description of the Related Art

As is known, storage systems exploiting a technology based on magnetism, such as, for example, hard disks, suffer from important limitations regarding the increase in the data-storage capacity and the read/write rate, and the reduction in their dimensions. In particular, there is a physical limit, the so-called "superparamagnetic limit", which constitutes an obstacle to the reduction in the dimensions of the magnetic-storage domains below a critical threshold, if the risk of losing the information stored is to be avoided.

Consequently, in the last few years, alternative storage systems have been proposed, amongst which the so-called "probe storage" systems have assumed particular importance. These systems enable high data-storage capacities to be achieved with reduced dimensions and with low manufacturing costs.

Figure 1:
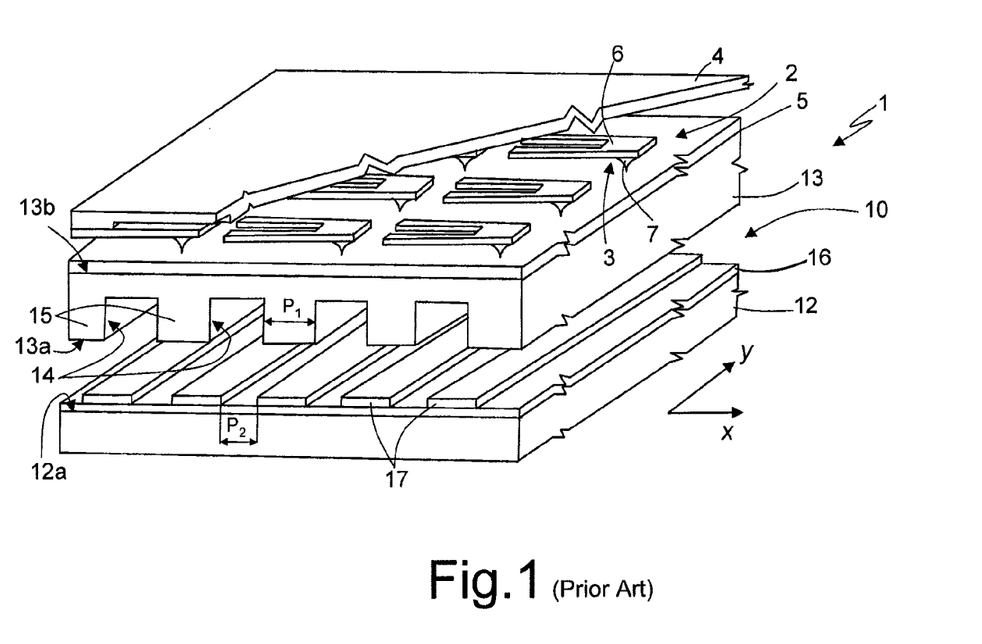
FIG. 1 is a schematic perspective cross section of a portion of a probe storage device.

As illustrated in FIG. 1, a storage device 1 of the probe-storage type comprises an array 2 of transducers (or probes) 3, arranged in rows and columns and fixed to an active substrate 4, made for example of silicon in CMOS technology (conveniently used also for providing control electronics for the storage device). The array of transducers is arranged above a storage medium 5 (for example, made of polymeric material, ferroelectric material, phase-change material, etc.), and is relatively mobile with respect thereto. Each transducer 3 comprises a supporting element 6 made of semiconductor material, suspended in cantilever fashion above the storage medium 5, and an interaction element 7 (or tip), facing the storage medium 5, and carried by the supporting element 6 at a free end thereof. The interaction element 7 is able to interact locally with a portion of the storage medium 5, for writing, reading, or erasing individual information bits.

The relative movement between the storage medium 5 and the array of transducers is generated by a micromotor 10 coupled to the storage medium 5. The micromotor 10 is of a linear electrostatic type, made with semiconductor technologies, and operates on capacitive variations.

In detail, the electrostatic micromotor 10 comprises a stator substrate 12, and a rotor substrate 13 arranged in use above the stator substrate 12 (the term "rotor" is used herein, as usually occurs in this technical field, to indicate a mobile element without necessarily referring to a rotary movement). Typically, both the rotor substrate 13 and the stator substrate 12 are made of semiconductor material, for example, silicon.

The rotor substrate 13 is suspended above the stator substrate 12 by means of elastic elements (not illustrated herein), and has, at a facing surface 13a facing the stator substrate 12, a plurality of rotor indentations 14; the rotor indentations 14 are obtained, for example, by anisotropic chemical etching and extend towards the inside of the rotor substrate 13. The rotor indentations 14 are set at a regular distance apart from one another by a first pitch $P_1$ in a sliding direction x. The rotor indentations 14 define between them rotor projections 15, extending towards the stator substrate 12.

The stator substrate 12 has, on a respective facing surface 12a facing the rotor substrate 13, an insulation layer 16, made, for example, of silicon oxide, on top of which a plurality of stator electrodes 17 is provided. The stator electrodes 17 are arranged at a regular distance apart from one another by a second pitch $P_2$ in the sliding direction x. The second pitch $P_2$ is different from, for example smaller than, the first pitch $P_1$, and the stator electrodes 17 are staggered with respect to the rotor projections 15 in the sliding direction x.

Each pair constituted by one rotor projection 15 and by the underlying stator electrode 17 forms a plane parallel plate capacitor with misaligned plates. When a voltage is applied between the misaligned plates, a force is generated, which tends to bring them back into an aligned position. Consequently, by appropriately biasing the stator electrodes 17 (with the rotor substrate 13 set generally at a reference potential) with biasing voltages conveniently out-of-phase with respect to one another, it is possible to generate an electrostatic interaction force, which brings about a relative linear movement of the rotor substrate 13 with respect to the stator substrate 12 in the sliding direction x. In particular, due to the presence of the rotor indentations 14, the capacitance C of the aforesaid capacitor is variable with the relative displacement between the stator substrate 12 and the rotor substrate 13, and in particular is maximum when the stator electrode 17 is aligned with one of the rotor projections 15, and minimum when the stator electrode 17 is aligned with one of the rotor indentations 14. The electrostatic interaction force, which causes the relative movement of the rotor substrate 13 with respect to the stator substrate 12, is proportional to the resultant capacitive variation in the sliding direction x (in particular to the derivative of this variation).

The storage medium 5 is set on an external surface 13b of the rotor substrate 13, opposite to the facing surface 13a that faces the stator substrate 12. In this way, actuation of the electrostatic micromotor 10 causes a corresponding movement of the storage medium 5 in the sliding direction x, and a relative displacement thereof with respect to the transducers 3. In particular, by appropriately driving the electrostatic micromotor 10, it is possible to control positioning of the transducers 3 at desired points of the storage medium 5, where it is desired to carry out the operations of reading, writing, or erasure of the stored data.

Figure 2:
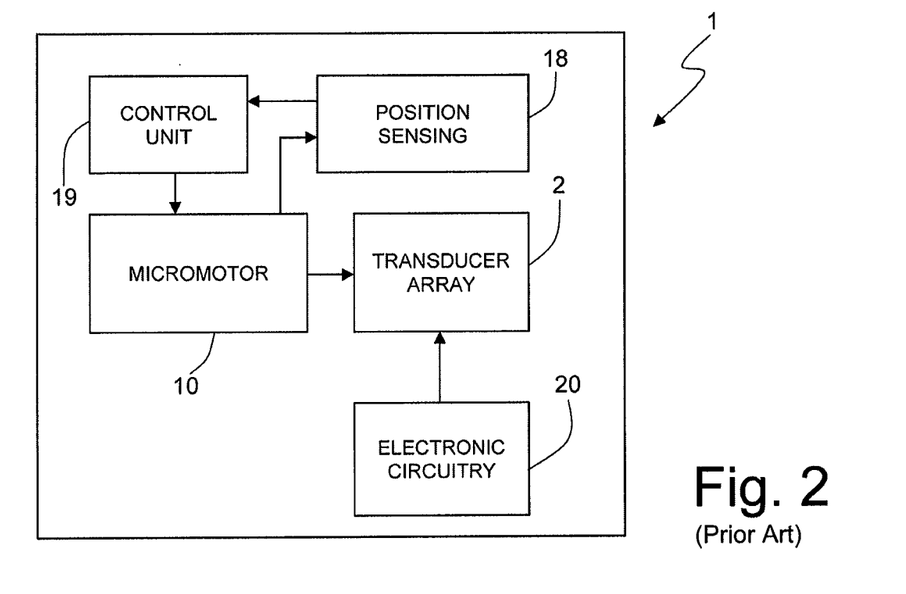
FIG. 2 is an overall block diagram of the probe storage device of FIG. 1.

As is shown schematically in FIG. 2, a control servomechanism is generally associated to the electrostatic micromotor 10; the control servomechanism comprises a position-sensing structure 18 designed to detect the relative position of the rotor substrate 13 with respect to the stator substrate 12, and a control unit 19, designed to carry out a feedback control of the actuation of the electrostatic micromotor 10 (and of the consequent positioning of the transducers 3), on the basis of the aforesaid detection of position. An electronic circuitry 20 is moreover connected to the array 2 for addressing the various transducers 3 (for example, via row and column multiplexers), and hence carrying out appropriate operations on the data stored in the storage medium 5.

Figure 3:
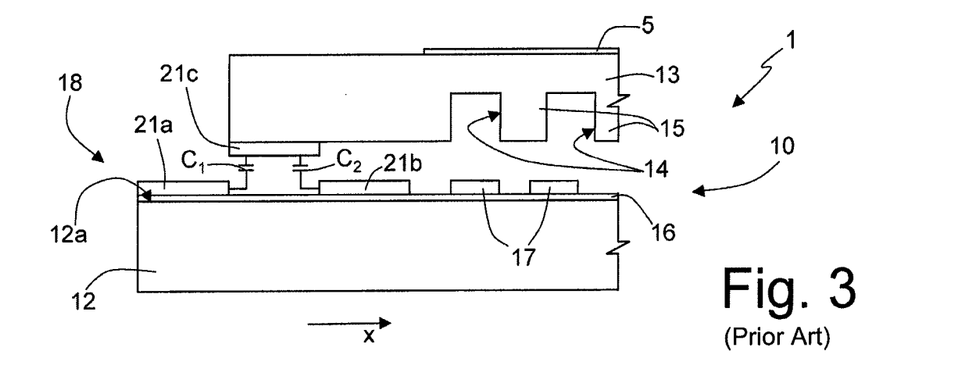
FIG. 3 shows an enlarged portion of the probe storage device of FIG. 1, which highlights a position-sensing structure of a known type.

In detail, and as shown in FIG. 3, the position-sensing structure 18, of a capacitive type, includes a first electrode 21a and a second electrode 21b, which are arranged above the insulation layer 16, laterally with respect to the stator electrodes 17 in the sliding direction x, for example in an area corresponding to an end portion of the stator substrate 12, and are biased at different voltages; and a third electrode 21c, set on the facing surface 13a of the rotor substrate 13 facing the stator substrate 12, which is set, in a rest position, between the first electrode 21a and the second electrode 21b. The first and second electrodes 21a, 21b form, with the third electrode 21c, a first sensing capacitor $C_1$ and a second sensing capacitor $C_2$, respectively. The surface area between the first and second electrodes 21a, 21b, and the third electrode 21c varies as a function of the position of the rotor substrate 13 with respect to the stator substrate 12, during its displacement in the sliding direction x. From a differential reading of the capacitance value of the first and second sensing capacitors $C_1$ and $C_2$, it is possible to determine the direction and amount of the aforesaid displacement, and so the relative position of the rotor substrate 13 with respect to the stator substrate 12.

The sensing structure described is not, however, optimized, due to the presence of a parasitic capacitance (as regards the aforesaid detection of position), which is formed between the third electrode 21c and the stator substrate 12. This parasitic capacitance brings about a lower sensitivity of the sensing structure to the variations of position, thus reducing the capacitive variation of the first and second sensing capacitors $C_1$, $C_2$ due to the relative displacement of the rotor substrate 13.

BRIEF SUMMARY

According to the present disclosure, an electrostatic micromotor and an electronic device comprising the electrostatic micromotor are provided. The electrostatic motor includes a fixed substrate, a mobile substrate facing said fixed substrate, electrostatic-interaction elements operable to enable movement of said mobile substrate with respect to said fixed substrate in a movement direction, and a capacitive position-sensing structure configured to detect a position of said mobile substrate with respect to said fixed substrate in said movement direction, said capacitive position-sensing structure including a sensing indentation extending within said mobile substrate from a first surface of the mobile substrate, and a first sensing electrode facing said sensing indentation.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein.

DETAILED DESCRIPTION

Figure 4:
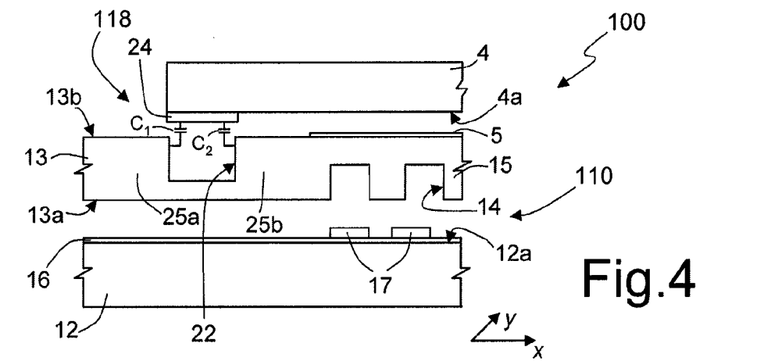
FIG. 4 shows a cross section of a portion of a probe storage device according to an embodiment of the present disclosure.
Figure 5:
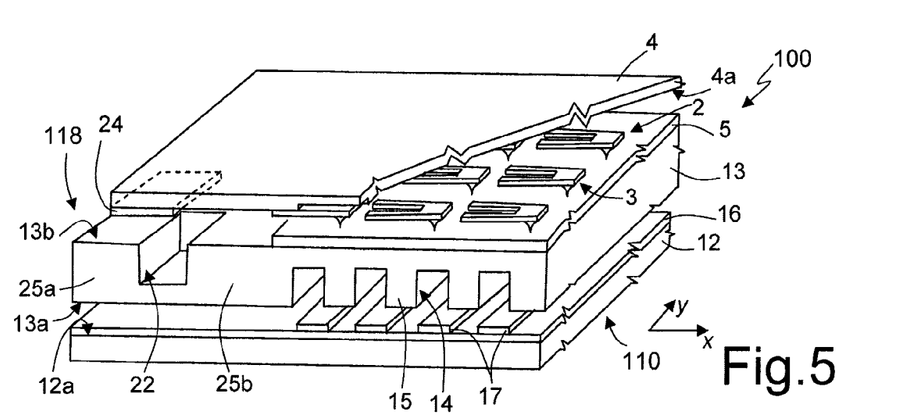
FIG. 5 is a perspective cross section of the probe storage device of FIG. 4.

FIGS. 4 and 5 show an electronic device 100, in particular a probe-storage device comprising an electrostatic micromotor 110, which differs from the one previously described substantially for a different construction of a corresponding capacitive position-sensing structure (for this reason, parts that are similar will be designated by similar reference numbers and will not be described again).

According to one embodiment of the disclosure, a position-sensing structure 118 includes a sensing indentation (or slot) 22, etched within the rotor substrate 13 to a given depth, for example, 30 μm, starting from its external surface 13b opposite to the facing surface 13a that faces the stator substrate 12, in an area not covered by the storage layer 5. The position-sensing structure includes a first sensing electrode 24, carried by the active substrate 4 and facing the external surface 13b, and in particular the sensing indentation 22. The first sensing electrode 24 is set on a facing surface 4a of the active substrate 4 that faces the rotor substrate 13. The first sensing electrode 24 is located in a distinct area with respect to an area that carries the array 2 of transducers 3, and has a shape that is as a whole elongated in an extension direction y, substantially orthogonal to the sliding direction x.

In addition, the first sensing electrode 24 may be made of the same metal layer in which the interaction elements 7 of the array of transducers 3 are made. The sensing indentation 22 also has a shape elongated in the extension direction y and dimensions substantially corresponding to those of the first sensing electrode 24. The elongated shape of the sensing indentation 22 defines laterally in the rotor substrate 13 a first sensing portion 25a and a second sensing portion 25b. The sensing electrode 24 forms with the first and second sensing portions 25a, 25b (when they are in a position facing one another, on account of the displacement of the rotor substrate 13) a first capacitor $C_1$ and a second capacitor $C_2$, respectively, a value of capacitance of which varies as a function of the mutual position of the rotor substrate 13 with respect to the active substrate 4. In use, the rotor substrate 13 is biased at a reference potential (for example, at ground), and the first and second capacitors $C_1$, $C_2$ are connected in parallel, to form a resultant sensing capacitor.

The relative displacement of the rotor substrate 13 in the sliding direction x causes a capacitance variation of the resultant sensing capacitor, whence it is possible to determine the amount of the displacement. Advantageously, the presence of the sensing indentation 22, in which air is present, with unitary dielectric constant, reduces the value of the parasitic capacitance "seen" by the first sensing electrode 24 at rest, and consequently increases the amount of capacitive variations arising during displacement of the rotor substrate 13 and consequent alignment of the first sensing electrode 24 with the first or second sensing portion 25a, 25b. Thus, the sensitivity in the detection of position increases in the electrostatic micromotor 110.

Figure 6:
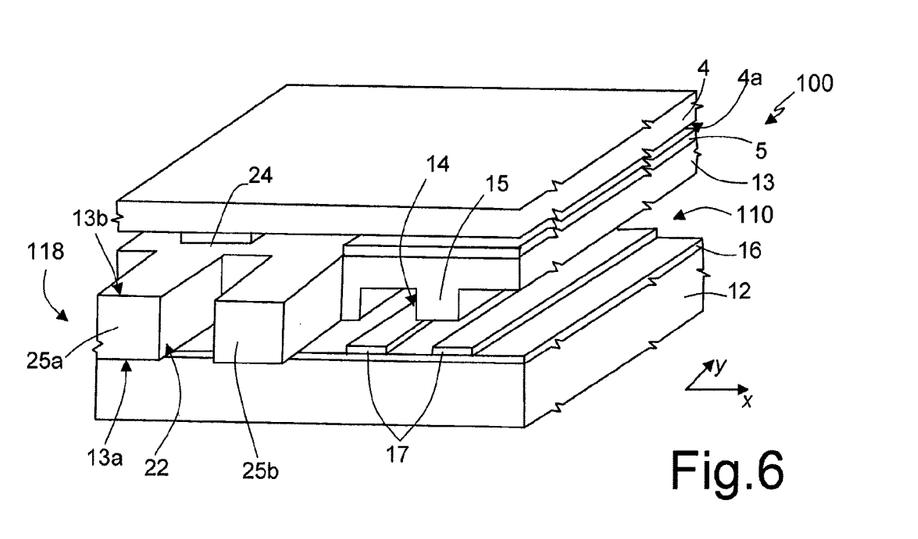
FIG. 6 is a perspective cross section of a probe storage device in accordance with another embodiment of the present disclosure.

FIG. 6 illustrates another embodiment of the position-sensing structure 118 where the sensing indentation 22 extends throughout an entire thickness of the rotor substrate 13, separating vertically the first and second sensing portions 25a, 25b. In addition, the etch leading to formation of the sensing indentation 22 is extended also laterally with respect to the sensing portions, which forms a conformation projecting in cantilever fashion from the rotor substrate 13 in the extension direction y. In particular, the first and second sensing portions 25a, 25b are each connected to the rotor substrate 13 at one end, and are surrounded elsewhere by an empty space. Advantageously, in this case, there is a further reduction in the value of the parasitic capacitance between the first sensing electrode 24 and the underlying structure, and consequently there is a further increase in the sensitivity of the capacitive detection of position.

Figure 7:
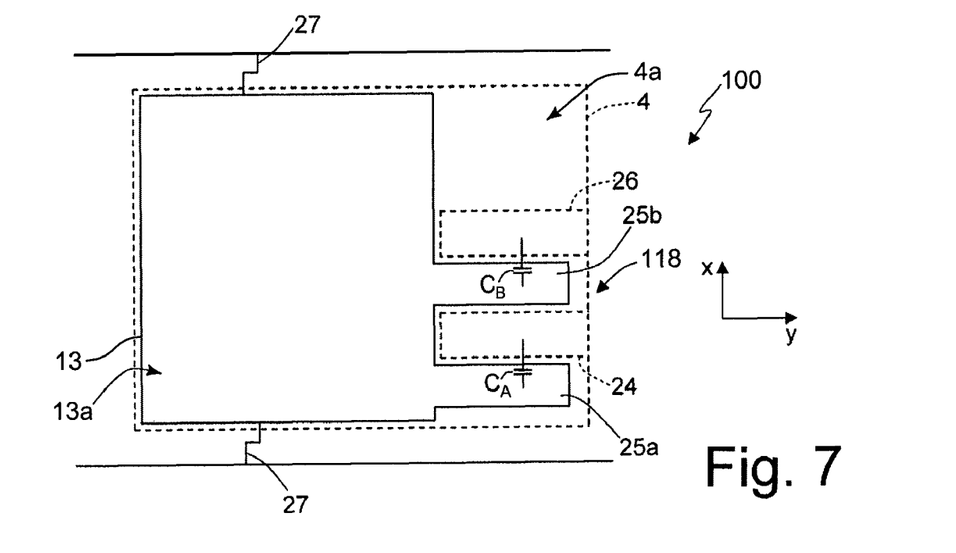
FIG. 7 is a top plan view of a variant of the probe storage device of FIG. 6.

FIG. 7 illustrates a view of the surface 13a of the rotor substrate 13 looking towards the active substrate 4. This further embodiment of the present disclosure includes a second sensing electrode 26, formed on the facing surface 4a of the active substrate 4 that faces the rotor substrate 13. For example, in the rest condition, the first sensing electrode 24 is set between the first and second sensing portions 25a, 25b, whilst the second sensing electrode 26 is set laterally with respect to one of the first and the second sensing projections 25a, 25b in the sliding direction x (in the case illustrated in FIG. 7, laterally with respect to the second sensing portion 25b). In FIG. 7 elastic elements 27 may also be noted for suspension of the rotor substrate 13 above the stator substrate 12.

The first sensing electrode 24 forms, with the underlying sensing portions 25a, 25b, a first sensing capacitor $C_A$ (equivalent to the resultant sensing capacitor previously defined), whilst the second sensing electrode 26 forms, with the sensing portion 25b, a second sensing capacitor $C_B$. Advantageously, by appropriately processing the capacitive variations of the first and second sensing capacitors $C_A$, $C_B$, and in particular the difference between the respective capacitance values $C_A$-$C_B$, it is possible to determine not only the amount of the relative displacement of the rotor substrate 13, but also the direction of the relative displacement in the sliding direction x.

Figure 8:
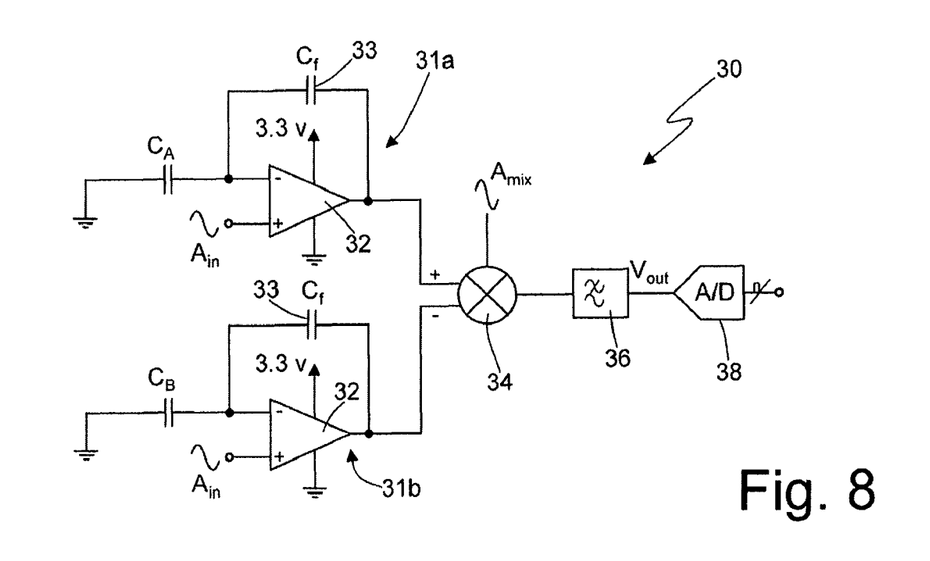
FIG. 8 is a circuit block diagram of a position-sensing circuit of the probe storage device.

In this regard, FIG. 8 shows a possible circuit embodiment of a position-reading circuit 30 in a control unit 19 of the electronic device 100, designed for feedback control of the actuation of the electrostatic micromotor 110. The position-reading circuit 30 supplies an output signal $V_{out}$ indicating the position of the electrostatic micromotor 110, the value of which is a function of the difference $C_A$-$C_B$ of the capacitances of the first and second sensing capacitors $C_A$, $C_B$.

In detail, the read circuit 30 comprises a first charge-amplifier stage 31a and a second charge-amplifier stage 31b, connected to the first and second sensing capacitors $C_A$, $C_B$, respectively. Each charge-amplifier stage 31a, 31b comprises an operational amplifier 32, receiving a supply voltage, for example, of 3.3 V, and having its inverting-input terminal connected to the respective sensing capacitor, its non-inverting-input terminal receiving an input sinusoidal signal, with an amplitude $A_{in}$ and a first frequency, and its output terminal feedback-connected to the inverting-input terminal via a feedback capacitor 33 having a capacitance $C_f$.

The read circuit 30 further includes a mixer stage 34 having a first, non-inverting input and a second, inverting input, which are connected to the outputs of the first and second charge-amplifier stages 31a, 31b, respectively, and a third, mixing input, receiving a mixing sinusoidal signal, having an amplitude $A_{mix}$ and a second frequency different from the first frequency. The read circuit 30 also includes a low-pass filter stage 36, which is connected to the output of the mixer stage 34 and supplies at output the output signal $V_{out}$, of an analog type, with an amplitude proportional to the expression appearing below $$V_{out} \propto \frac{1}{2} \cdot A_{in} \cdot A_{mix} \cdot \frac{C_A - C_B}{C_f}$$

and in particular, proportional to the difference $C_A$-$C_B$ between the capacitances of the first and second sensing capacitors $C_A$, $C_B$.

The output signal $V_{out}$ can then be converted from analog to digital by an analog-to-digital converter stage 38 operating on n bits, and is then supplied, for subsequent processing operations, to the control unit 19.

Another embodiment of the present disclosure (FIG. 9) envisages provision of a plurality of sensing indentations 22 in the rotor substrate 13, and a plurality of first and second sensing electrodes 24, 26 carried by the active substrate 4. This structure, as will be clarified hereinafter, is advantageous for detecting large displacements between the rotor substrate 13 and the stator substrate 12, partializing the total displacement into a plurality of equal stretches with repetitive pattern.

Figure 9:
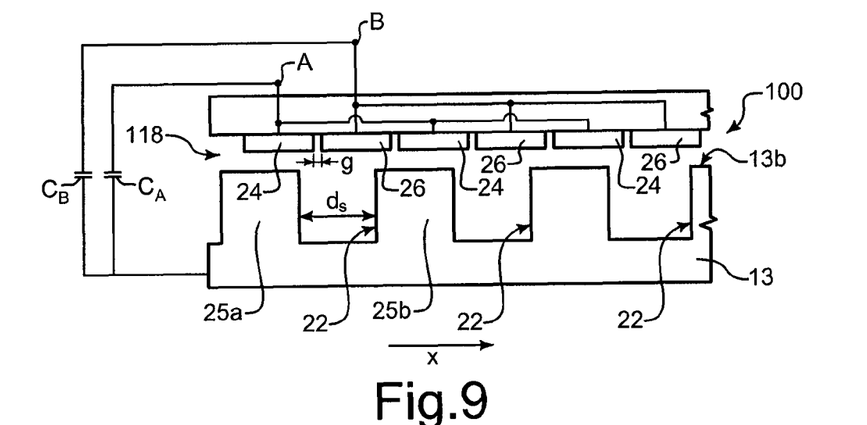
FIG. 9 shows a cross section of a probe storage device in another embodiment of the present disclosure.

In detail, the sensing indentations 22 follow one another in the sliding direction x at a regular separation distance $d_s$, for example, 7 μm. Each indentation has the same width (measured in the sliding direction x), for example, 7 μm, and extends within the rotor substrate 13 for a depth of, for example, 30 μm. In addition, the sensing portions 25a, 25b have a width equal to that of the sensing indentations 22. The first and second sensing electrodes 24, 26 follow one another alternating in the sliding direction x, separated from the external surface 13b of the rotor substrate 13 by a distance of, for example, 1.5 μm. In addition, a gap g, smaller than the separation distance $d_s$, is provided between each of the first sensing electrodes 24 and the second sensing electrodes 26 adjacent thereto. In particular, the width of the sensing electrodes 24, 26 (in the sliding direction x) added to the gap g is equal to the width of the sensing portions 25a, 25b. The first and second sensing electrodes 24, 26 are located in a same relative position with respect to the underlying sensing indentation 22 and the sensing portions 25a, 25b, respectively. Furthermore, as shown schematically, the first sensing electrodes 24 are connected to one another and to a first terminal A, the second sensing electrodes 26 are connected to one another and to a second terminal B, and the rotor substrate 13 is connected to ground.

Figure 10:
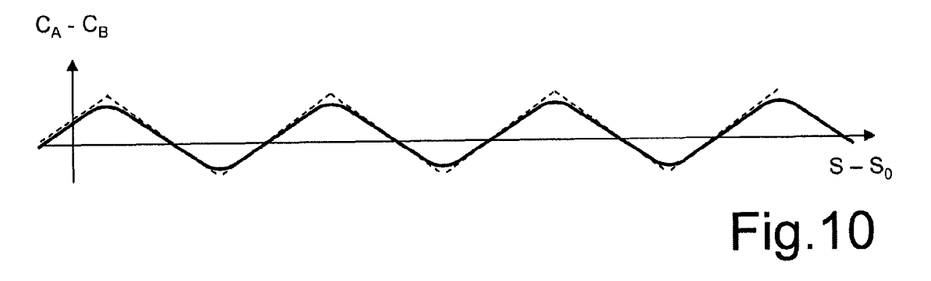
FIG. 10 is a graph showing the plot of an electrical quantity associated to the probe storage device of FIG. 9.

As is shown in FIG. 10, the arrangement above for the electrodes and the sensing indentations causes the trend of the difference $C_A$-$C_B$ between the capacitances of the first and the second sensing capacitors $C_A$, $C_B$ to assume a periodic pattern constituted by the repetition of a number of equal stretches, as the displacement of the rotor substrate 13, designated by S, varies with respect to a resting position $S_0$. Advantageously, within each stretch, the values of the difference $C_A$-$C_B$ are limited, so that it is not necessary to use, in the read circuit 30, an analog-to-digital converter operating on a large number of bits, at the same time ensuring a high resolution in the detection of position.

Figure 11:
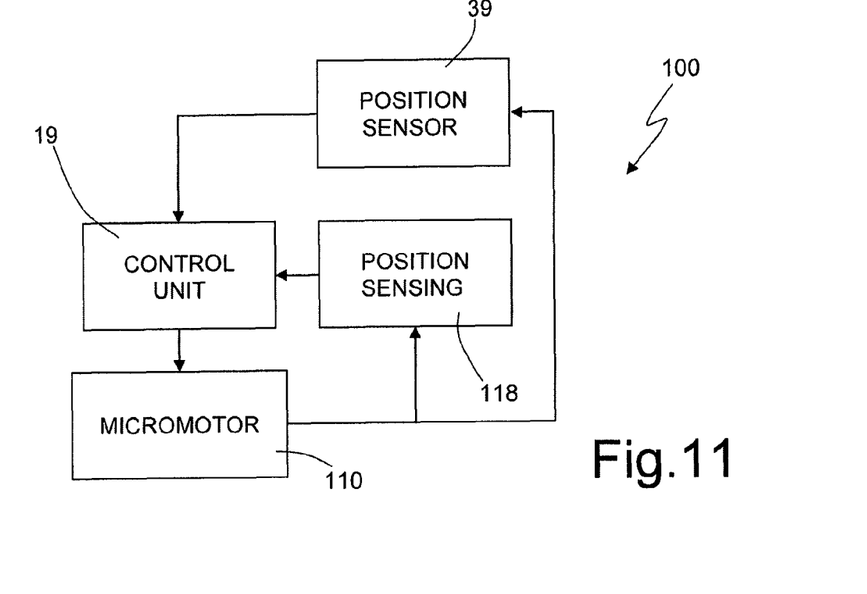
FIG. 11 shows an overall block diagram of a servomechanism of the probe storage device.

As is shown in FIG. 11, the control servomechanism of the electrostatic micromotor 110 comprises in this case a further position sensor 39 for a coarse detection of the position of the rotor substrate 13 with respect to the stator substrate 12, and in particular for identification of the stretch in the periodic pattern previously described corresponding to the effective displacement of the rotor substrate 13, in addition to the position-sensing structure 118, which is designed to carry out a fine determination of the rotor substrate position within the identified stretch. For example, in a way not shown, the position sensor 39 can comprise a further sensing electrode, which is mobile fixedly with respect to the rotor substrate 13, and is coupled to further electrodes, which are fixed with respect to the active substrate 4 and are set at a distance apart from one another in the sliding direction x. The sensing electrode injects a signal towards ground, and the consequent identification of a high level of current at one of the electrodes coupled thereto enables coarse detection of the position of the rotor substrate.

The control unit 19 receives the information of position both from the further position sensor 39 and from the position-sensing structure 118, so as to perform feedback control of the electrostatic micromotor 110.

A further variant of the present disclosure envisages an increase in the linearity of the trend of the capacitive difference $C_A$-$C_B$, and consequently in the linearity of the capacitive position sensing.

As illustrated in FIG. 10, the trend of the capacitive difference with respect to an ideal trend (represented with a dashed line) has a portion that is rounded off in the neighborhood of a maximum/minimum thereof, with the consequence of a loss of resolution. This trend is a consequence of the presence of the gap g separating consecutive sensing electrodes, which causes a maximum value of the aforesaid capacitive difference not to vary as long as a further displacement of the rotor substrate 13 remains smaller than this gap.

Figure 12:
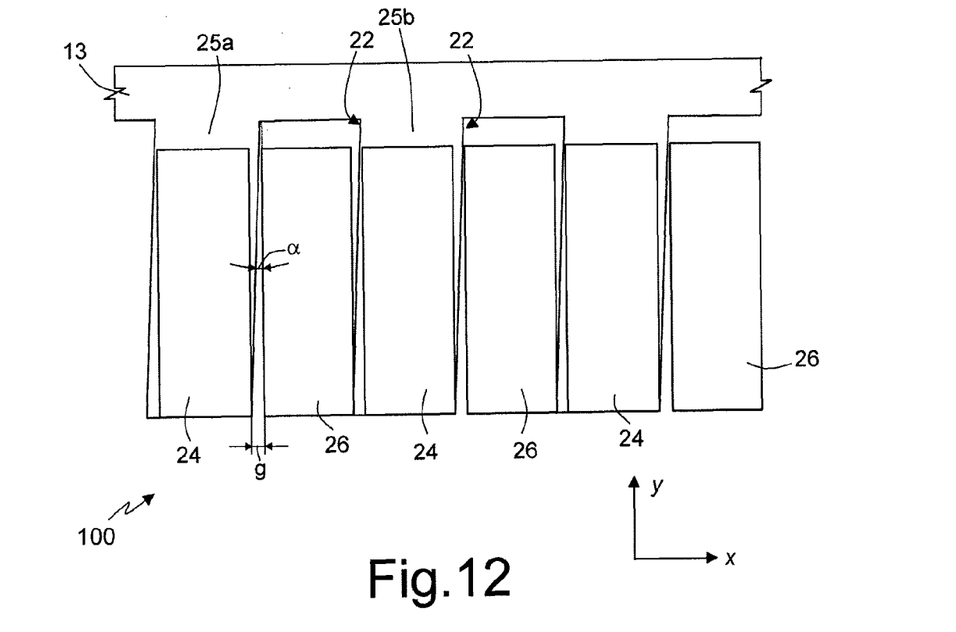
FIG. 12 is a top plan view of a variant of the probe storage device of FIG. 9.

To solve the above problem and to obtain an evolution of the capacitive difference that is more linear and practically equal to the ideal one, it is proposed (FIG. 12) to make the sensing indentations 22 inclined with respect to the sensing electrodes 24, 26. For example, the first and second sensing electrodes 24, 26 extend once again parallel to the extension direction y, whilst the sensing indentations 22 extend at an inclination angle α with respect to this extension direction. In particular, in the example of FIG. 12, the inclination angle α is equal to the arcsine of the ratio between the gap g and the length of the sensing indentations 22 (or, equivalently, of the sensing portions 25a, 25b). In this way, a situation does not arise in which the sensing electrodes 24, 26 are arranged entirely above an underlying sensing indentation 22 throughout a range of displacement equal to the gap g, and consequently the aforesaid rounded-off area of the capacitive trend is eliminated.

In yet another embodiment of the present disclosure (FIG. 13) envisages that the first (and possibly the second) sensing electrodes 24 (26) are not carried by the active substrate 4, but by the stator substrate 12, in particular that they are arranged above the insulating layer 16 and the respective facing surface 12a towards the rotor substrate 13, in a position vertically corresponding to the sensing indentations 22 (which, in the case shown in FIG. 13, extend once again throughout the thickness of the rotor substrate 13). The sensing capacitors are in this case formed between the sensing electrodes and the facing surface 13a of the sensing portions 25a, 25b. Advantageously, also in this case, the parasitic capacitance seen by the sensing electrodes in the rest condition is reduced, thanks to the presence of the sensing indentation 22 made in the rotor substrate 13.

From what has been described and illustrated above, the advantages of the capacitive position-sensing structure according to the disclosure are evident.

In particular, the presence of the sensing indentations 22 facing the sensing electrodes 24, 26 enables minimization of the value of the parasitic capacitance, and hence maximization of the capacitive variation that arises between the sensing electrodes 24, 26 and the corresponding first/second sensing portions 25a, 25b due to displacement between the rotor substrate 13 and the stator substrate 12. In this way, it is possible to increase the sensitivity of the servomechanism controlling actuation of the electrostatic micromotor 110 and increase the precision in the positioning of the transducers 3 for interaction with the storage medium 5.

It is to be noted that the provision of the sensing indentation 22 does not involve additional technologies or process steps with respect to the ones for providing the electrostatic micromotor 110, given that micromachining of the rotor substrate 13 is already envisaged, for example, for forming the rotor indentations 14 (instead, micromachining and corresponding process steps are not envisaged for the stator substrate 12).

The capacitive variation $C_A$-$C_B$, which is a function of the relative displacement between the rotor substrate 13 and the stator substrate 12, can be detected in a simple and effective way with the read circuit 30, independently of frequency and resistive spreads. In particular, it is advantageous for this purpose to connect the rotor substrate 13 to ground.

The presence of a plurality of sensing indentations 22 and of corresponding first and second sensing electrodes 24, 26 enables an increase in resolution in the case of large relative displacements between the rotor substrate 13 and the stator substrate 12.

In addition, the presence of a non-zero inclination angle α between the direction of main extension of the sensing indentations 22 and that of the sensing electrodes 24, 26 enables an increase in linearity in the detection of position.

From the standpoint of manufacturing flexibility, it is also advantageous to be able to position the first and second sensing electrodes 24, 26 either on the stator substrate 12 of the electrostatic micromotor 110 or on the active substrate 4 of the corresponding electronic device, in any case achieving the aforesaid advantage of reduction in the parasitic capacitance.

Finally, it is clear that modifications and variations can be made to what is described and illustrated herein, without thereby departing from the scope of the present disclosure.

In particular, a different number of indentations and sensing electrodes can be provided, for detecting the relative position of the rotor substrate 13 with respect to the stator substrate 12.

Figure 13:
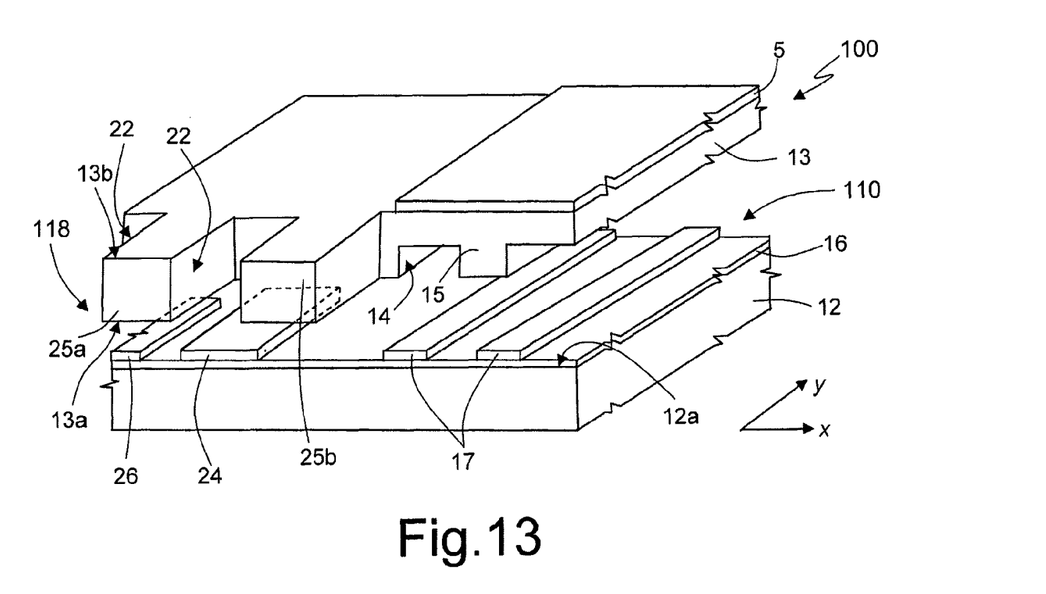
FIG. 13 is a perspective cross section of a probe storage device, according to yet another embodiment of the present disclosure.

In FIG. 13, the arrangement of the sensing electrodes 24, 26 above the stator substrate 12 illustrates the sensing indentation 22 extending through the entire thickness of the rotor substrate 13. Alternatively, the sensing indentation may extend through a portion of the thickness of the rotor substrate, starting from the facing surface 13a towards the stator substrate 12 (in a way similar to what is shown in FIGS. 4 and 5).

In addition, the read circuit 30 could have a different circuit architecture (of a known type), for example of the switched-capacitor type, with the possibility of avoiding the presence of a demodulation stage and of obtaining an optimization of the number of operational amplifiers.

It is evident that other uses can be envisaged for the capacitive position-sensing structure according to the disclosure, different from the storage device described. For example, the structure described can be implemented in an optical switch device, of a known type, in which the electrostatic micromotor 110 is used for moving and orienting means for reflection of a light beam.

The active substrate that carries, in certain embodiments, the sensing electrodes, can finally be configured to perform different functions and integrate further circuits.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electrostatic micromotor, comprising:
a fixed substrate;
a mobile substrate having a first surface and a second surface, the first surface facing said fixed substrate;
electrostatic-interaction elements operable to enable movement of said mobile substrate with respect to said fixed substrate in a movement direction; and
a capacitive position-sensing structure including a first sensing portion and a second sensing portion laterally defining opposite sides of a sensing indentation extending completely through a thickness of said mobile substrate from the first surface to the second surface of the mobile substrate, the first and second sensing portions extending in cantilever fashion from the mobile substrate, and a first sensing electrode facing said sensing indentation.

2. The micromotor of claim 1 wherein the first sensing electrode is positioned on a first surface of the fixed substrate that is facing the first surface of the mobile substrate.

3. The micromotor of claim 1, further comprising an active substrate facing said mobile substrate, the active substrate being separated from the fixed substrate by the mobile substrate.

4. The micromotor of claim 3 wherein the first sensing electrode is positioned on a surface of the active substrate that is facing the second surface of the mobile substrate.

5. The micromotor of claim 1 wherein the first sensing portion and the second sensing portion are configured to cooperate with said first sensing electrode to form a sensing capacitor having a capacitance that is variable as a function of a relative displacement of said mobile substrate with respect to said fixed substrate.

6. The micromotor according to claim 5, wherein said capacitive position-sensing structure includes a second sensing electrode, facing said sensing indentation and set alongside said first electrode in said movement direction; said second electrode forming, with said first and second sensing portions, a second sensing capacitor, a capacitance of which is variable as a function of the relative displacement of said mobile substrate with respect to said fixed substrate.

7. The micromotor of claim 6 wherein said capacitive position-sensing structure includes a further first sensing electrode that is electrically connected to said first sensing electrode, a further second sensing electrode that is electrically connected to said second sensing electrode, and a further sensing indentation, said first sensing electrodes alternating with said second sensing electrodes in said movement direction separated by a separation gap, and said sensing indentations positioned adjacent one another in said movement direction.

8. The micromotor of claim 7 wherein the first and second sensing portions have a first width in said movement direction, and said first and second electrodes have a second width, in said movement direction; the sum of said second width and said separation gap being substantially equal to said first width.

9. The micromotor of claim 6 wherein said first and second sensing electrodes extend parallel to one another in a first extension direction, and said sensing indentations extend parallel to one another in a second extension direction, inclined by a non-zero angle with respect to said first extension direction.

10. The micromotor of claim 1 wherein said sensing indentation contains air, and wherein said mobile substrate and said fixed substrate comprise semiconductor material.

11. The micromotor of claim 1 wherein said electrostatic-interaction elements comprise electrodes arranged on a surface of said fixed substrate facing said mobile substrate, and indentations, extending within said mobile substrate starting from the first surface facing said fixed substrate and defining projections on the mobile substrate that are staggered with respect to said electrodes on said fixed substrate in said movement direction.

12. An electronic device, comprising:
an electrostatic micromotor that includes:
a fixed substrate;
a mobile substrate having a first surface and a second surface, the second surface facing said fixed substrate;
electrostatic-interaction elements operable to enable movement of said mobile substrate with respect to said fixed substrate in a movement direction; and
a capacitive position-sensing structure including a sensing indentation extending within said mobile substrate from the first surface of the mobile substrate, and a first sensing electrode facing said sensing indentation; and
an active substrate facing the mobile substrate, the first sensing electrode being positioned on a surface of the active substrate facing the first surface of the mobile substrate and corresponding to the sensing indentation on the mobile substrate.

13. The electronic device of claim 12, further comprising a storage medium coupled to the first surface of the mobile substrate configured to move, in use, in said movement direction, and an array of transducers coupled to said active substrate, facing said storage medium, and configured to interact with said storage medium.

14. The electronic device of claim 13 wherein said storage medium is positioned laterally with respect to said sensing indentation.

15. The electronic device of claim 12 wherein said mobile substrate includes a first sensing portion and a second sensing portion laterally defining opposite sides of the sensing indentation configured to cooperate with said first sensing electrode to form a first sensing capacitor having a capacitance that is variable as a function of a relative displacement of said mobile substrate with respect to said active substrate.

16. The electronic device of claim 15 wherein said capacitive position-sensing structure further comprises a second sensing electrode, facing said first surface of the mobile substrate and set alongside said first electrode in said movement direction; said second electrode configured to cooperate with said first and second sensing portions to form a second sensing capacitor, a capacitance of which is variable as a function of the relative displacement of said mobile substrate with respect to said active substrate.

17. The electronic device of claim 16, further comprising a control unit connected to said capacitive position-sensing structure for implementing a feedback control of said electrostatic micromotor said control unit and said capacitive position-sensing structure implementing a servomechanism of said electronic device.

18. The electronic device of claim 17, wherein said control unit includes a read circuit configured to determine a relative displacement of said mobile substrate with respect to said fixed substrate as a function of a capacitive difference between capacitances of said first and second sensing capacitors.

19. An electronic device, comprising:
an electrostatic micromotor that includes:
a fixed substrate;
a mobile substrate facing the fixed substrate;
electrostatic-interaction elements operable to enable movement of the mobile substrate with respect to the fixed substrate in a movement direction; and
a capacitive position-sensing structure including a sensing indentation extending within the mobile substrate from a first surface of the mobile substrate, a first sensing portion and a second sensing portion laterally defining opposite sides of the sensing indentation, a first sensing electrode and a second sensing electrode facing the sensing indentation and configured to cooperate with the first sensing portion and the second sensing portion to form a first sensing capacitor and a second sensing capacitor, respectively;
an active substrate facing the mobile substrate; and
a control unit connected to the capacitive position-sensing structure for implementing a feedback control of the electrostatic micromotor, the control unit and the capacitive position-sensing structure implementing a servo-mechanism of the electronic device, the control unit including:
a read circuit configured to determine a relative displacement of the mobile substrate with respect to the fixed substrate as a function of a capacitive difference between capacitances of the first and second sensing capacitors, the read circuit including:
a first charge-integrator stage and a second charge-integrator stage connected to the first and second sensing capacitors;
a mixer stage coupled to the output of the first and second charge-integrator stages; and
a low-pass filtering stage coupled to the output of the mixer stage and supplying an output signal, the value of which is a function of the capacitive difference.

20. The electronic device of claim 19 wherein said capacitive difference has a periodic trend comprising a repetition of a plurality of substantially equal stretches; wherein said read circuit is configured to detect said relative position within a given stretch among said stretches, and said control unit is configured to identify said given stretch within said periodic trend.

21. A method comprising:
manufacturing an electrostatic motor having a fixed substrate and a mobile substrate, the manufacturing including:
forming a capacitive position-sensing structure configured to detect a position of the mobile substrate with respect to the fixed substrate in said movement direction, the forming including:
forming a plurality of sensing portions that lateral define a plurality of sensing indentations extending completely through the mobile substrate from a first surface to a second surface of the mobile substrate, the sensing portions extending in cantilever fashion from the mobile substrate;
forming a plurality of sensing electrodes on the fixed substrate facing the first surface of the mobile substrate, the sensing electrodes facing the sensing indentations of the mobile substrate; and
forming electrostatic-interaction elements operable to enable movement of said mobile substrate with respect to said fixed substrate in a movement direction.

22. The method of claim 21, further comprising:
forming a rotor indentation in the first surface of the mobile substrate spaced from the sensing indentations by a first distance; and
forming a storage medium on the second surface of the mobile substrate, the storage medium spaced from the sensing indentations by the first distance.

23. The method of claim 21, further comprising forming an active substrate facing the second surface of the mobile substrate, the active substrate separated from the fixed substrate by the mobile substrate.

24. An electrostatic micromotor, comprising:
a fixed substrate;
a mobile substrate having a first surface and a second surface, the first surface facing the fixed substrate;
an active substrate having a surface facing the second surface of the mobile substrate, the active substrate being separated from the fixed substrate by the mobile substrate;
electrostatic-interaction elements operable to enable movement of the mobile substrate with respect to the fixed substrate in a movement direction; and
a capacitive position-sensing structure including a sensing indentation extending within the mobile substrate from the second surface of the mobile substrate, and a first sensing electrode positioned on the surface of the active substrate, the first sensing electrode facing the sensing indentation.

25. The micromotor of claim 24 wherein the mobile substrate includes a first sensing portion and a second sensing portion that define the sensing indentation.

26. The micromotor of claim 25, further comprising a second sensing electrode positioned on the surface of the active substrate and spaced from the first sensing electrode by a gap, the first and second sensing portions have a first width in the movement direction, and the first and second electrodes have a second width, in the movement direction, the sum of the second width and the gap being substantially equal to the first width.

27. An electrostatic micromotor, comprising:
a fixed substrate;
a mobile substrate having a first surface and a second surface, the first surface facing the fixed substrate;
electrostatic-interaction elements operable to enable movement of the mobile substrate with respect to the fixed substrate in a movement direction; and
a capacitive position-sensing structure including a plurality of sensing portions that define a plurality of sensing indentations extending within the mobile substrate, the plurality of sensing portions having a first width in the movement direction, and a plurality of sensing electrodes having a second width in the movement direction and separated from each other by a gap, the sum of the second width and the gap being substantially equal to the first width.

28. The micromotor of claim 27 wherein the plurality of sensing electrodes are positioned on a surface of the fixed substrate that is facing the first surface of the mobile substrate.

29. The micromotor of claim 27, further comprising:
an active substrate facing the mobile substrate and separated from the fixed substrate by the mobile substrate, the plurality of sensing electrode being positioned on a surface of the active substrate facing the second surface of the mobile substrate.

30. The micromotor of claim 27 wherein the plurality of sensing indentations extend completely through a thickness of the mobile substrate from the first surface to the second surface of the mobile substrate to form a plurality of sensing portions that are configured to cooperate with the plurality of sensing electrodes to form a plurality of sensing capacitors.

31. An electrostatic micromotor, comprising:
a fixed substrate;
a mobile substrate having a first surface and a second surface, the first surface facing the fixed substrate;
electrostatic-interaction elements operable to enable movement of the mobile substrate with respect to the fixed substrate in a movement direction; and
a capacitive position-sensing structure including a plurality of sensing indentations extending within the mobile substrate and a plurality of sensing electrodes facing the sensing indentations, the plurality of sensing electrodes extending parallel to one another in a first extension direction and the plurality of sensing indentations extending parallel to one another in a second extension direction, inclined by a non-zero angle with respect to the first extension direction.

32. The micromotor of claim 31 wherein the plurality of sensing electrodes are positioned on a surface of the fixed substrate that is facing the first surface of the mobile substrate.

33. The micromotor of claim 31, further comprising:
an active substrate facing the mobile substrate and separated from the fixed substrate by the mobile substrate, the plurality of sensing electrode being positioned on a surface of the active substrate facing the second surface of the mobile substrate.

* * * * *